(No Model.) 3 Sheets—Sheet 1.

R. WYLIE.
COMBINED REEL AND SPRINKLER.

No. 400,030. Patented Mar. 19, 1889.

WITNESSES:
W. R. Davis.
C. Sedgwick

INVENTOR:
R. Wylie
BY Munn & Co.
ATTORNEYS.

(No Model.) 3 Sheets—Sheet 2.

R. WYLIE.
COMBINED REEL AND SPRINKLER.

No. 400,030. Patented Mar. 19, 1889.

WITNESSES:
W. R. Davis
C. Sedgwick

INVENTOR:
R. Wylie
BY
Munn & Co.
ATTORNEYS.

(No Model.) 3 Sheets—Sheet 3.
R. WYLIE.
COMBINED REEL AND SPRINKLER.
No. 400,030. Patented Mar. 19, 1889.
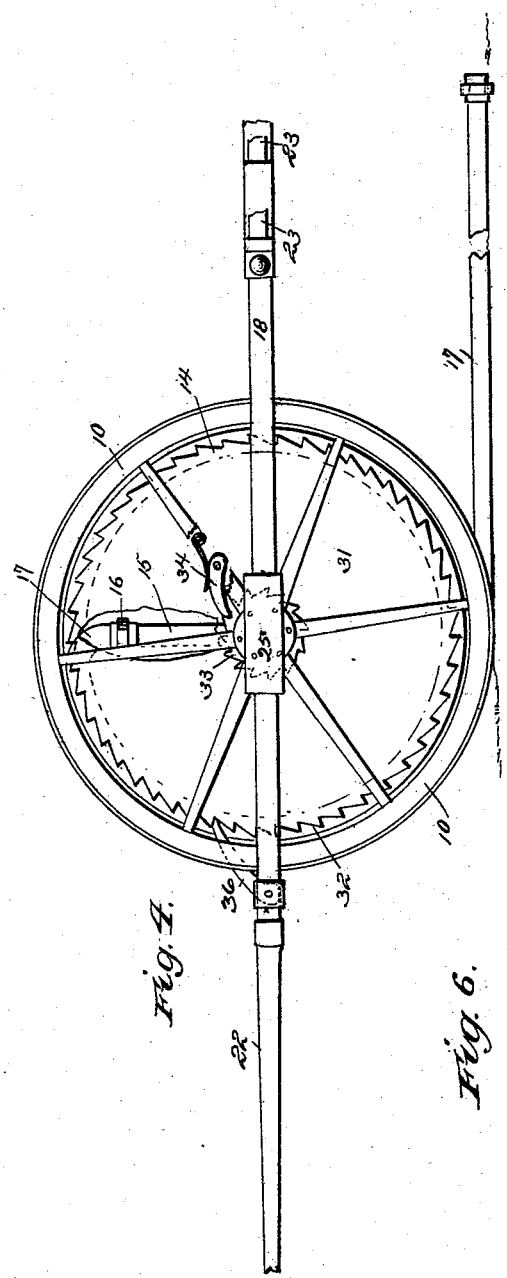
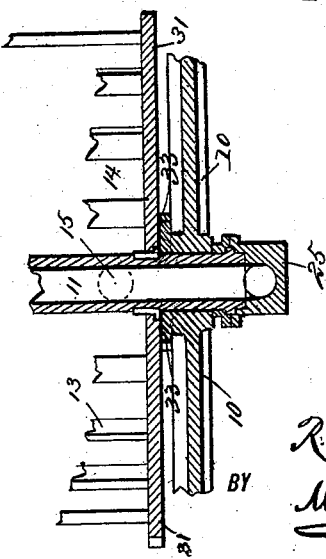
WITNESSES:
W. R. Davis
C. Sedgwick
INVENTOR:
R. Wylie
BY Munn & Co.
ATTORNEYS.

UNITED STATES PATENT OFFICE.

RICHARD WYLIE, OF NAPA, CALIFORNIA.

COMBINED REEL AND SPRINKLER.

SPECIFICATION forming part of Letters Patent No. 400,030, dated March 19, 1889.

Application filed September 27, 1888. Serial No. 286,548. (No model.)

*To all whom it may concern:*

Be it known that I, RICHARD WYLIE, of Napa, in the county of Napa and State of California, have invented a new and Improved Combined Reel and Sprinkler, of which the following is a full, clear, and exact description.

My invention is an improvement in that class of combined reels and sprinklers which are mounted on wheels and adapted to allow a continuous discharge of water while the reel is moving from or toward the hydrant or other source of supply.

The invention is embodied in the construction and combination of parts hereinafter described and claimed.

Reference is to be had to the accompanying drawings, forming a part of this specification, in which similar figures of reference indicate corresponding parts in all the views.

Figure 1:
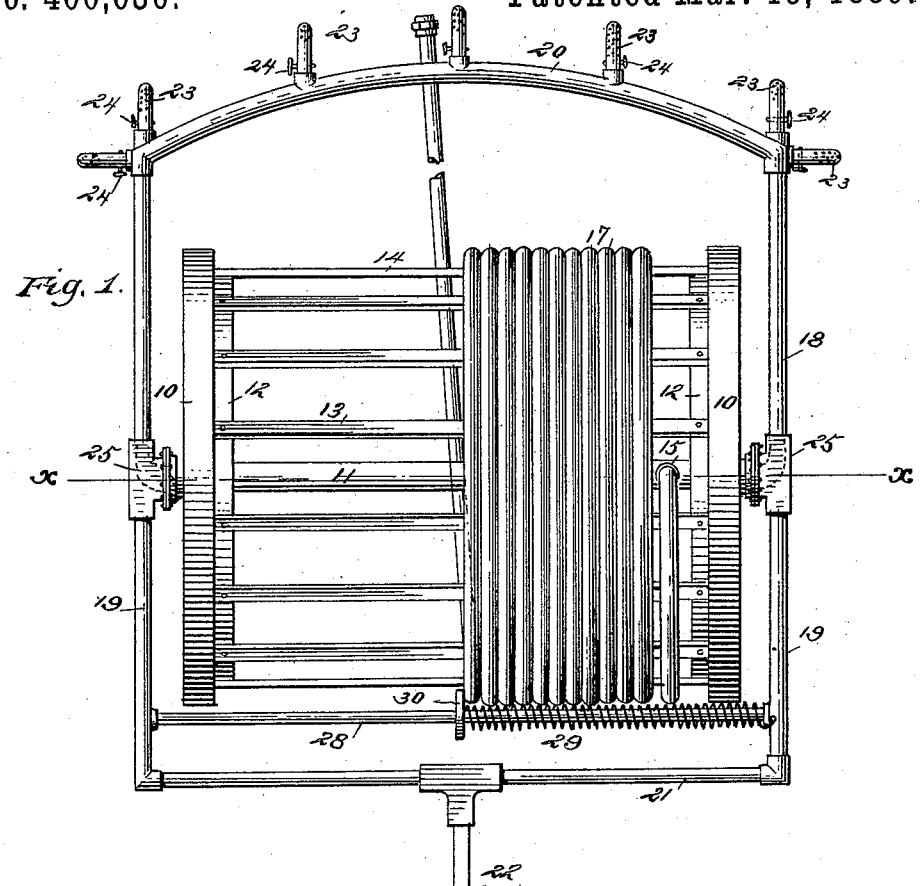
Figure 2:
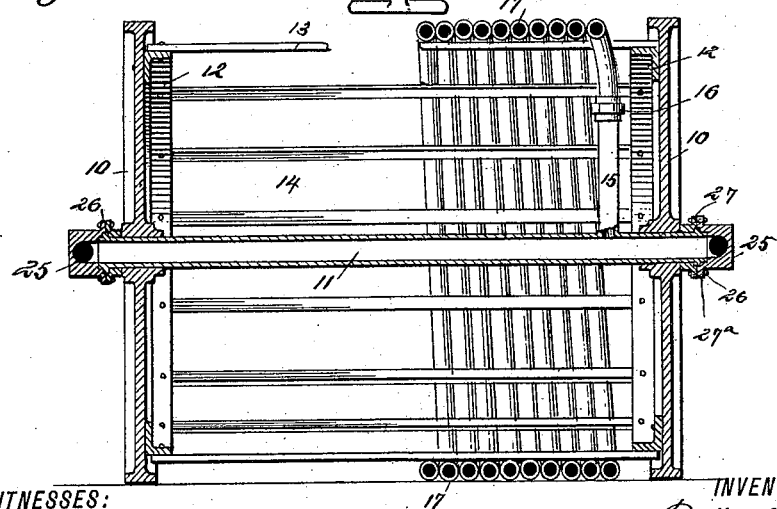
Figure 3:
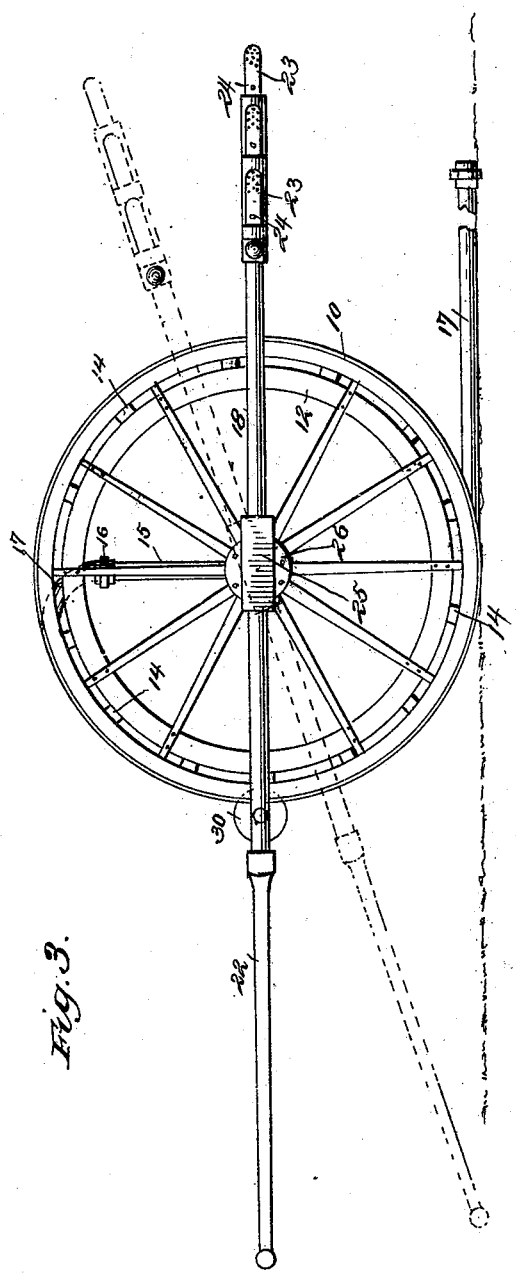

Figure 1 is a plan view of the machine. Fig. 2 is a transverse section on line $x\ x$ of Fig. 1. Fig. 3 is a side elevation illustrating in dotted lines the inclination of the body. Fig. 4 is a side elevation of a modified form of the device specially adapted for sprinkling streets. Fig. 5 is a partial plan view of the rear end of the frame, and Fig. 6 is a horizontal section taken through Fig. 5.

In carrying out the invention the wheels 10 are journaled upon a tubular axle, 11, in any approved manner, the said wheels being provided upon the inner face, near the periphery, with an annular flange, 12, extending outward at right angles thereto, as best illustrated in Fig. 2. To the outer face of the flanges 12 a series of slats, 13, either of metal or wood, are secured, forming a reel, 14, and from the tubular axle 11 a stand-pipe, 15, is projected outward, preferably through the slats of the reel, having secured thereto, by a suitable union, 16, or other equivalent coupling, one end of a hose-section, 17, which hose-section is adapted to be wound upon the reel, as best shown in Figs. 1 and 2. The wheels and reels secured thereto are incased in a frame, 18, which frame is preferably constructed of pipe consisting of parallel sides 19, a forward, preferably outwardly-curved, end, 20, and a straight inner end, 21. While I describe the preferred contour of the said frame, I desire it to be distinctly understood that I do not confine myself thereto, as the said frame may be made of different shape without departing from the spirit of the invention.

A handle, 22, is attached in any approved manner to the inner end of the frame 21, at or near the center, and from the curved outer end, 20, a series of perforated nozzles, 23, are projected, which nozzles are each provided with a valve, 24, the said nozzles constituting the sprinklers, and the valves 24 are provided to cut off the supply of water to the same whenever it may be found desirable.

The sprinkling-tubes 23 may be attached also, if desired, to the sides of the frame at or near their union with the outer end of the same, and when it is found desirable the said sprinkling-tubes may be located along the sides from the outer end to a point approximating the axle.

The frame 18 is pivoted upon the tubular axle 11, and connected therewith by a tubular socket, whereby the water passing through the hose and into the axle may be also supplied to the sprinkling-tubes 23, through the medium of the frame. The pivotal tubular connection of the frame with the axle may be effected in any well-known manner.

In the drawings I have illustrated one means of effecting a union, which consists of forming an annular rib, 26, upon the outer ends of the axle, placing a ring, 27, also upon the axle between the wheel and the rib in engagement with the latter, and securing to the said ring, by means of bolts or otherwise, a tubular T fitting or socket, 25, having a flange, 27ᵃ, as best illustrated in Fig. 2, the said fitting and ring at their point of engagement being recessed to receive the rib 26, whereby the frame is swiveled or pivoted upon the axle, and may be elevated or depressed without interfering with the flow of the water from the said axle to the sprinklers.

Ordinarily the side pieces of the frame 18 are made in two sections, the outer section being secured into one end of the fitting 25, which fitting is provided with a bore. (Illustrated in dotted lines in Fig. 1.) The other or inner section is also secured into the fitting or, preferably, into a blind socket. Thus the water will only flow from the axle in direction of the sprinklers and not in the direction of the handle; but, if it is desired, a three-way bore may be produced in the fitting and the water thereby be caused to circulate around the entire frame.

At or near the inner end of the frame a rod, 28, is secured therein parallel with the length of the wheel, upon which rod a spring, 29, is coiled, fastened at one end to the frame and secured at the other end to a collar, 30, sliding upon the said rod, the tension of the spring being in the direction of the end attached to the frame.

The collar 30 is adapted to engage the inner coil of the hose upon the reel, as best illustrated in Fig. 1, and as the tension of the spring constantly draws the collar outward against the hose the several coils of the latter are kept in close contact.

It will be observed, by reason of the spring above set forth, that the hose may be attached to any convenient hydrant and the machine drawn forward, uncoiling the hose, without stopping the flow of water to the sprinkling-tubes, and that the machine may be pushed in direction of the hydrant and the hose wound up with the same result.

If it is desired to water one particular spot more than another, the handle may be dropped to the ground, causing the frame to stand in the inclined position illustrated in Fig. 3 in dotted lines, whereby the sprinkling-tubes are elevated at such an angle as is best adapted to the distribution of the water over the desired surface.

In the form of machine illustrated in Figs. 4, 5, and 6, the reel does not constitute a portion of the drive-wheels. The reels in this instance consist of two opposing heads, 31, connected by a series of rods, 13, in similar manner as shown in the connection of the two reels in Fig. 1. The periphery of the heads 31 is provided with a series of ratchet-teeth, 32, and the said heads upon the inner side may be provided with a horizontal annular flange, if desired. The reel is fast on the axle 11, and the latter rotates independently of the wheels 10, which are loosely mounted thereon. On the inside of the wheel-hubs is fixed a small ratchet-wheel, 33, as best shown in Fig. 4. A spring-pressed dog or pawl, 34, is pivoted to the head 31 of the reel and engages this ratchet 33.

A pin or stud, 35, is projected from the inner face of the frame in advance of the wheel 10, and upon said stud a dog, 36, is pivoted, purposed to engage with the ratchet-teeth upon the periphery of the reel-heads.

When the hose is attached to the hydrant and the machine drawn forward, the dog 34 passes loosely over the ratchet-wheel 33, permitting the hose to unwind, the dog 36 being thrown out of engagement with the teeth 32. When it is desired to wind the hose upon the reel, the dog 36 is thrown in engagement with the teeth 32 and the machine pushed rearward in direction of the hydrant. Should the hose become loosely wound at any time, the same may be tightened by dropping the handle 22 to the ground, whereupon the dog 36 will engage with one of the teeth 32 near the bottom of the reel-head. The handle 22 is then brought upward or raised again to (or above) a horizontal position, whereby the reel is rotated independently of the wheels 10, thus winding the hose on the reel or tightening it, as the case may be.

Having thus described my invention, what I claim as new, and desire to secure by Letters Patent, is—

1. The combination of the tubular frame mounted on wheels provided with the handle 22 and having a series of sprinkling-nozzles, 23, secured upon its front end, the tubular axle having a tubular connection with the sides of said frame, a reel mounted on the axle, and a hose adapted to be wound on the reel and connecting with the axle, as shown and described, whereby when the machine is pushed or drawn along the passage of water through the axle and frame may be maintained, as specified.

2. The combination of the tubular frame having nozzles at its front end, a tubular axle journaled in said frame and communicating with it, wheels applied to the axle, the reel mounted on the latter, a hose connecting with the axle, a ratchet affixed to the reel, and a pawl pivoted on the frame, and a second ratchet and pawl attached to the wheel hub and reel, respectively, and arranged as shown, whereby when said frame is oscillated vertically the reel is revolved independently of the wheels and the hose thereby wound on the reel, as shown and described.

3. The combination, with a tubular frame, a tubular axle journaled in said frame, wheels mounted upon said axle, and a reel secured to said wheels, of a hose attached to the axle and wound upon the reel, a spring-actuated sliding collar engaging the inner coil of the hose, and sprinkling-tubes attached to the said frame, substantially as shown and described.

4. The combination, with a tubular frame, an axle journaled in said frame and connected therewith, and a reel mounted upon the said axle, of a hose coiled upon the reel and connected with the axle, a transverse bar at one side of the reel, a spring-actuated collar sliding upon said bar and engaging the inner coil of the hose, sprinkling-tubes connected with the frame, and a valve located in said tubes, all combined to operate substantially as and for the purpose specified.

RICHARD WYLIE.

Witnesses:
 L. A. BICKFORD,
 E. L. BICKFORD.